United States Patent
Stoychev et al.

(10) Patent No.: US 9,308,786 B2
(45) Date of Patent: Apr. 12, 2016

(54) TIRE INFLATION SYSTEM

(71) Applicant: DANA HEAVY VEHICLE SYSTEMS GROUP, LLC, Maumee, OH (US)

(72) Inventors: Stoyan I. Stoychev, Sylvania, OH (US); Brian V. Knapke, Toledo, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 43 days.

(21) Appl. No.: 13/261,965

(22) PCT Filed: Apr. 5, 2013

(86) PCT No.: PCT/US2013/035399
§ 371 (c)(1),
(2) Date: Oct. 2, 2014

(87) PCT Pub. No.: WO2013/152270
PCT Pub. Date: Oct. 10, 2013

(65) Prior Publication Data
US 2015/0273958 A1    Oct. 1, 2015

Related U.S. Application Data

(60) Provisional application No. 61/621,142, filed on Apr. 6, 2012.

(51) Int. Cl.
*B60C 29/00* (2006.01)
*B60C 23/00* (2006.01)
*B60C 23/10* (2006.01)

(52) U.S. Cl.
CPC ............... *B60C 23/10* (2013.01); *B60C 23/003* (2013.01)

(58) Field of Classification Search
CPC .... B60C 23/00; B60C 23/001; B60C 23/003; B60C 23/004; B60C 23/10; B60C 23/16; B60C 29/00
See application file for complete search history.

(56) References Cited

U.S. PATENT DOCUMENTS

| | | | |
|---|---|---|---|
| 3,705,614 A | | 12/1972 | Juttner et al. |
| 4,434,833 A | * | 3/1984 | Swanson ............... B60C 23/003 141/38 |
| 4,470,506 A | | 9/1984 | Goodell et al. |
| 4,678,017 A | | 7/1987 | Schultz |
| 4,730,656 A | | 3/1988 | Goodell et al. |
| 4,804,027 A | | 2/1989 | Runels |
| 4,893,664 A | | 1/1990 | Oltean |

(Continued)

FOREIGN PATENT DOCUMENTS

| EP | 0588595 A1 | 3/1994 |
|---|---|---|
| EP | 1088751 A2 | 4/2001 |

(Continued)

*Primary Examiner* — John Walters
*Assistant Examiner* — James Triggs
(74) *Attorney, Agent, or Firm* — Marshall & Melhorn, LLC

(57) ABSTRACT

A tire inflation system including an axle housing and a sealing ring disposed on the axle housing. The sealing ring has a conduit formed therethrough. A hub is disposed on the axle housing and adjacent the sealing ring. A hub ring is disposed on the hub and adjacent the sealing ring. The hub ring has a conduit formed therethrough. An inner seal member and an outer seal member are disposed between sealing ring and the hub ring. The conduit formed through the hub ring is in fluid communication with the conduit formed through the sealing ring through an area between the inner seal member and the outer seal member.

17 Claims, 3 Drawing Sheets

(56) References Cited

U.S. PATENT DOCUMENTS

| | | |
|---|---|---|
| 4,987,937 A | 1/1991 | Nowicke |
| 5,174,839 A | 12/1992 | Schultz et al. |
| 5,203,391 A | 4/1993 | Fox |
| 5,221,381 A | 6/1993 | Hurrell, II |
| 5,769,979 A | 6/1998 | Naedler |
| 5,868,881 A | 2/1999 | Bradley |
| 5,979,526 A | 11/1999 | Chamoy |
| 6,105,645 A | 8/2000 | Ingram |
| 6,145,558 A | 11/2000 | Schmitz |
| 6,145,559 A | 11/2000 | Ingram, II |
| 6,182,727 B1 | 2/2001 | Beesley |
| 6,199,611 B1 | 3/2001 | Wernick |
| 6,220,325 B1 | 4/2001 | Saibold et al. |
| 6,230,556 B1 | 5/2001 | Malinowski |
| 6,244,316 B1 | 6/2001 | Naedler |
| 6,260,595 B1 | 7/2001 | Cobb et al. |
| 6,286,565 B1 | 9/2001 | Pike |
| 6,363,985 B1 | 4/2002 | Beesley |
| 6,435,238 B1 | 8/2002 | Hennig |
| 6,492,805 B1 | 12/2002 | Wakabayashi et al. |
| 6,497,262 B1 | 12/2002 | Skoff et al. |
| 6,550,511 B2 | 4/2003 | Nienhaus |
| 6,585,019 B1 | 7/2003 | Ingram |
| 6,938,658 B2 | 9/2005 | Jarrett et al. |
| 6,968,882 B2 | 11/2005 | Ingram |
| 6,976,789 B2 | 12/2005 | Pilone |
| 7,117,909 B2 | 10/2006 | Jarrett et al. |
| 7,168,468 B2 | 1/2007 | Wang et al. |
| 7,306,020 B2 | 12/2007 | Beverly et al. |
| 7,530,379 B1 | 5/2009 | Becker et al. |
| 7,690,412 B1 | 4/2010 | Jenkinson et al. |
| 7,896,045 B2 | 3/2011 | Solie et al. |
| 7,931,061 B2 | 4/2011 | Gonska et al. |
| 7,963,159 B2 | 6/2011 | Ingram et al. |
| 7,967,045 B2 | 6/2011 | Jenkinson et al. |
| 7,975,739 B1 | 7/2011 | Ingram |
| 8,069,890 B2 | 12/2011 | Resare et al. |
| 8,087,439 B2 | 1/2012 | Hobe et al. |
| 8,479,790 B2 | 7/2013 | Resare et al. |
| 8,505,600 B2 | 8/2013 | Padula et al. |
| 2005/0133134 A1 | 6/2005 | Ingram et al. |
| 2005/0161137 A1 | 7/2005 | Hoang |
| 2008/0185086 A1 | 8/2008 | Ingram et al. |

FOREIGN PATENT DOCUMENTS

| | | |
|---|---|---|
| GB | 2477816 A | 8/2011 |
| WO | 2012/071579 A1 | 5/2012 |

\* cited by examiner

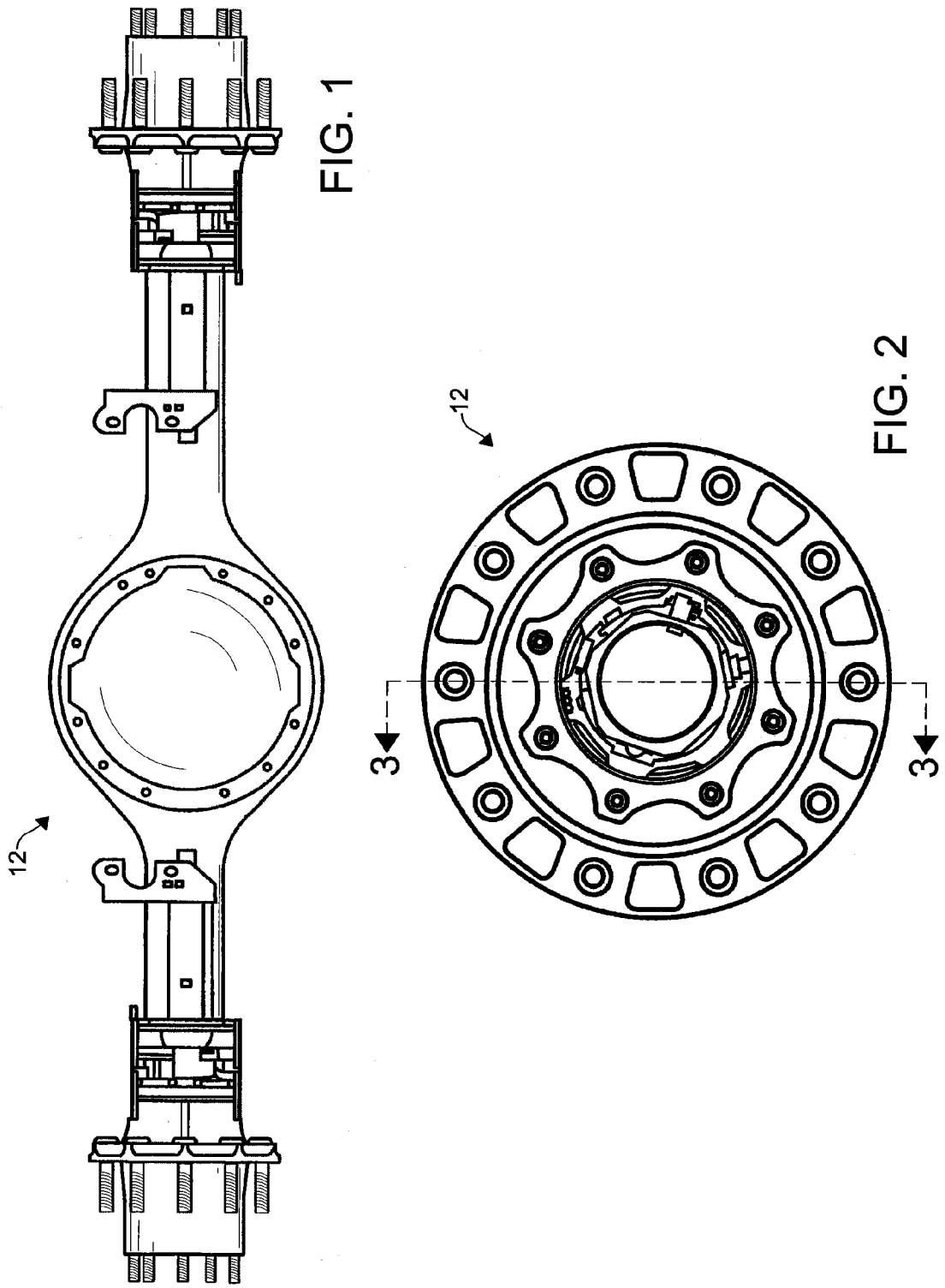

US 9,308,786 B2

TIRE INFLATION SYSTEM

CROSS-REFERENCE TO RELATED APPLICATIONS

This application is claiming the benefit, under 35 U.S.C. 119(e), of the provisional application which was granted Ser. No. 61/621,142 filed on Apr. 6, 2012, the entire disclosure of which is hereby incorporated by reference.

BACKGROUND OF THE INVENTION

The invention relates to a tire inflation system and, more particularly, to a tire inflation system for use with a vehicle.

Tire inflation systems for vehicles are used to provide a vehicle with the versatility to maneuver over differing terrain types and to reduce maintenance requirements. For example, a plurality of tires in fluid communication with a tire inflation system may be at a pressure which can be lowered to provide additional traction for the vehicle or raised to reduce the rolling resistance and increase the fuel efficiency of the vehicle. Additionally, utilizing a tire inflation system may eliminate the need to periodically check the pressure and adjust the pressure within each tire.

However, tire inflation systems are difficult to install on a drive axle due to the increased complexities associated therewith, spacing requirements, and associated costs. For example, unless the tire inflation system is wholly mounted on a wheel in communication with the system, a rotary seal must be employed to permit fluid communication between a pump and each tire included in the tire inflation system. Additionally, when the tire inflation system is employed on a drive axle, the conduit for the pressurized fluid may be routed on an outside of the axle housing and the tire inflation system may become unnecessarily complex.

Thus, it would be desirable to provide a tire inflation system that includes one or more of the aforementioned advantages and overcomes the aforementioned difficulties.

BRIEF SUMMARY OF THE INVENTION

A tire inflation system is provided.

In an embodiment, the tire inflation system comprises an axle housing and a sealing ring disposed on the axle housing. The sealing ring has a conduit formed therethrough. A hub is disposed on the axle housing adjacent the sealing ring. A hub ring is disposed on the hub adjacent the sealing ring and has a conduit formed therethrough. The tire inflation system also comprises an inner seal member and an outer seal member. The inner seal member and the outer seal member are disposed between the sealing ring and the hub ring. The conduit formed through the hub ring is in fluid communication with the conduit formed through the sealing ring through an area between the inner seal member and the outer seal member.

In another embodiment, tire inflation system comprises an axle housing and a sealing ring disposed on the axle housing. The sealing ring has a conduit formed therethrough which is in fluid communication with a pump conduit. A hub is rotatably disposed on the axle housing adjacent the sealing ring and a hub ring disposed on and attached to an end portion of the hub adjacent the sealing ring. The hub ring has a conduit formed therethrough. A tone ring is attached to the hub ring and is provided inboard of an inner seal member. The inner seal member is disposed between the sealing ring and hub ring. The tire inflation system also comprises an outer seal member provided outboard of the inner seal member. The outer seal member is disposed between the sealing ring and the hub ring. The conduit formed through the hub ring is in fluid communication with the conduit formed through the sealing ring through an area between the inner seal member and the outer seal member and the conduit formed through the hub ring is in fluid communication with a conduit formed through a wheel stud via a secondary conduit.

BRIEF DESCRIPTION OF THE SEVERAL VIEWS OF THE DRAWINGS

The above, as well as other advantages of the process will become readily apparent to those skilled in the art from the following detailed description when considered in the light of the accompanying drawings in which:

FIG. 1 depicts a front view of a drive axle assembly which has a tire inflation system in accordance with the invention;

FIG. 2 depicts an end view of the drive axle assembly of FIG. 1;

DETAILED DESCRIPTION OF THE INVENTION

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Embodiments of a tire inflation system 10 are described herein. The tire inflation system will be described in connection for use with a vehicle (not depicted). It would be understood by one of ordinary skill in the art that the various embodiments of the tire inflation system described herein may have applications to commercial and off-highway vehicles. Furthermore, it would be understood by one of ordinary skill in the art that these embodiments could have industrial, locomotive, military and aerospace applications.

Embodiments of the tire inflation system 10, which hereinafter may also be referred to as the "system", are preferably used with a drive axle assembly 12 for the vehicle. An embodiment of the drive axle assembly 12 suitable for use with the tire inflation system 10 is best shown in FIGS. 1 and 2. However, it should be appreciated that the tire inflation system may be used apart from a drive axle assembly. For example, in certain embodiments (not depicted), the tire inflation system may be used with a steer axle assembly.

Figure 3:
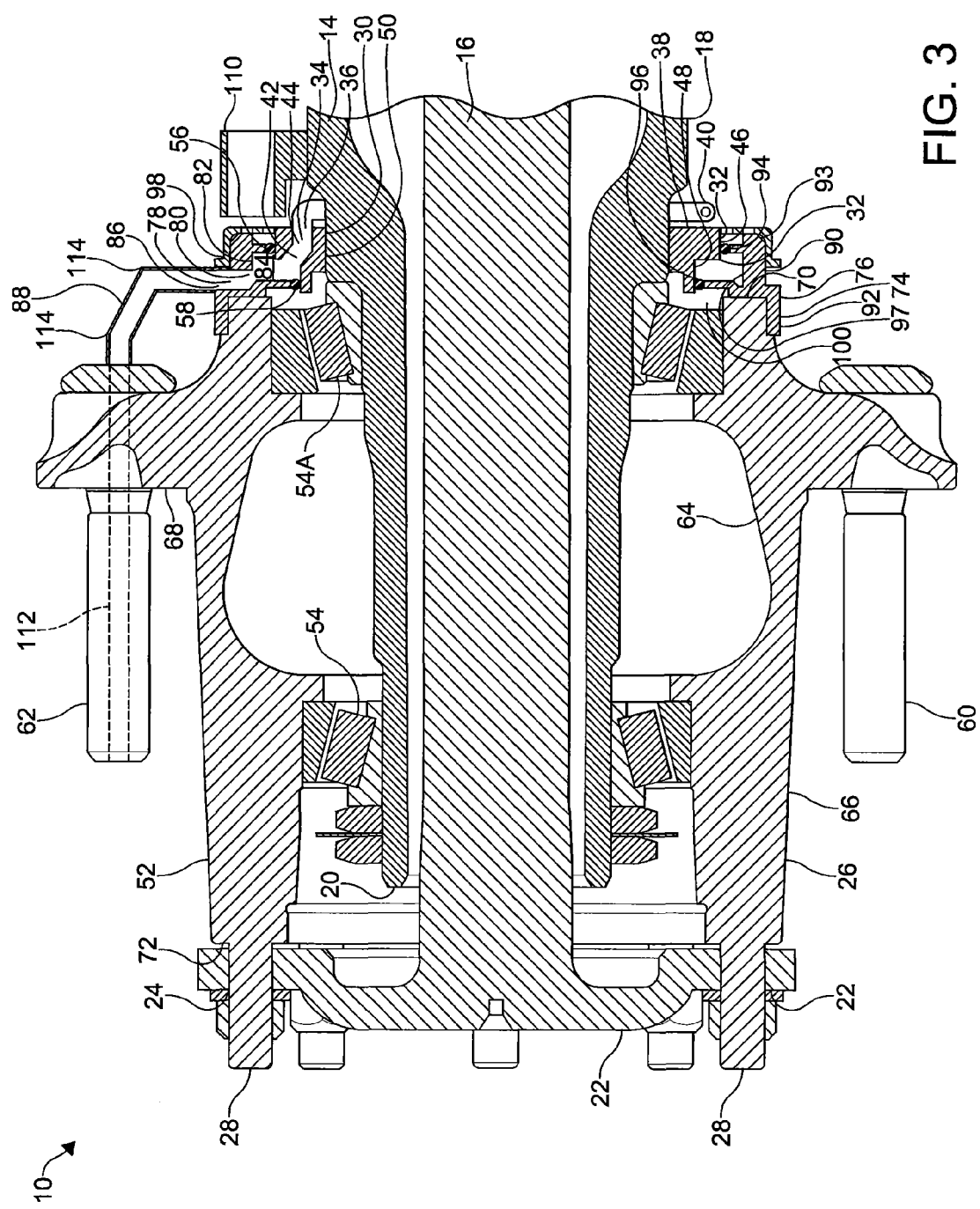
FIG. 3 depicts a cross-sectional view of a portion of the drive axle of FIG. 1 along line 3-3 and illustrates an embodiment of the tire inflation system in accordance with the invention.

Referring now to FIG. 3, the tire inflation system 10 comprises an axle housing 14. The axle housing 14 may be formed unitarily or may comprise a plurality of components coupled together. The axle housing 14 is a hollow member into which an axle 16 is rotatably disposed through. In an embodiment, the axle housing 14 comprises an outer surface 18 which is of a stepped cylindrical shape and may reduce in diameter towards an end 20.

The axle 16 is rotatably disposed in the axle housing 14 and is preferably a drive axle. The axle 16 includes a flanged end 22. The flanged end 22 has one or more perforations 24 formed therethrough for coupling the axle 16 to a hub assembly 26. Preferably, the axle 16 is coupled to the hub assembly 26 with a plurality of threaded fasteners 28. However, it should be understood that the axle 16 may be coupled to the hub assembly 26 in any other conventional manner.

The tire inflation system 10 comprises a sealing ring 30. The sealing ring 30 and the hub assembly 26 are fitted to the axle housing 14. The sealing ring 30 and the hub assembly 26 are disposed about the outer surface 18 of the axle housing 14. Preferably, the sealing ring 30 is non-rotatably disposed on the outer surface 18 of the axle housing 14.

The sealing ring 30 is a generally annular member and is preferably metallic. The sealing ring 30 has an outer surface 32 and a conduit 34 formed therethrough. An inlet 36 of the conduit 34 is formed on an inboard edge 38 of the sealing ring 30. Preferably, the inlet is in fluid communication with a pump conduit 40 which is in communication with a fluid pump (not depicted). The pump conduit 40 extends around a portion of the outer surface 18 of the axle housing 14. An outlet 42 of the conduit 34 is formed on the outer surface 32 of the sealing ring 30. In an embodiment, a major portion 44 of the sealing ring conduit 34 is formed such that it is in a parallel relationship with the axle housing 14.

The outer surface 32 of the sealing ring 30 is of a general cylindrical shape. The outer surface 32 may comprise a first diameter portion 46 and a second diameter portion 48. The first diameter portion 46 has a diameter which is of a length that is greater than that of a diameter of the second diameter portion 48. The sealing ring 30 also comprises an inner surface 50 which is disposed about a portion of the outer surface 18 of the axle housing 14.

The hub assembly 26 comprises a hub 52. Preferably, the hub 52 is rotatably disposed on the axle housing 14 and provided adjacent the sealing ring 30. The hub 52 is preferably rotatably disposed on the axle housing 14 using a pair of bearing sets 54, 54A disposed between the hub 52 and the axle housing 14. The bearing sets 54, 54A are similar to each other and are conventional in the art. Preferably, the bearing sets 54, 54A are disposed about and engaged on the axle housing 14 before an inner seal member 56 and an outer seal member 58 are advanced during the manufacture of the system 10. Operating in this manner prevents misalignment of the seal members 56, 58 on the sealing ring 16 during assembly.

The hub assembly 18 may be configured to hold a wheel assembly (not depicted) which is attached to the hub 52 using a plurality of wheel studs 60, 62. The hub 52 is also attached to the axle 16 and drivingly engaged therewith. The hub 52 is an annular member having an inner surface 64 and an outer surface 66. At least a portion of the inner surface 64 of the hub 52 has a stepped cylindrical shape. The outer surface 86 defines a hub flange 68. The hub flange 68 engages the wheel assembly and is an annular protuberance having a plurality of perforations formed therethrough into which the wheel studs 60, 62 are disposed. The hub 52 also comprises an inboard end 70 and an outboard end 72. A hub ring 74 is attached to the outer surface 66 and is disposed on the inboard end 70 and the axle 16 is attached to the outboard end 72 of the hub 52.

The hub ring 74 is disposed on the hub 52 adjacent the sealing ring 30. The hub ring 74 is an annular member comprising an outer surface 76 and a conduit 78 formed therethrough. In an embodiment, the conduit 78 formed through the hub ring 74 is formed in a perpendicular relationship with the axle housing 14. An inlet 80 of the conduit 78 is formed on an inner surface 82 of the hub ring 74 and is in fluid communication with an area 84 formed between the inner seal member 56 and the outer seal member 58. An outlet 86 of the conduit 78 is formed on the outer surface 76 of the hub ring 74 and is in fluid communication with a secondary conduit 88.

The outer surface 76 of the hub ring 74 may comprise a first diameter portion 90 and a second diameter portion 92. The first diameter portion 90 has a diameter which is of a length that is less than that of a diameter of the second diameter portion 92. The outer surface 76 of the hub ring 74 may also comprise a chamfered edge 93 included in an inboard end portion of hub ring 74. The inner surface 82 of the hub ring 74 may comprise a first diameter portion 94 and a second diameter portion 96. The first diameter portion 94 has a diameter which is of a length that is greater than that of a diameter of the second diameter portion 96. The inner surface 82 may also comprise an intermediate diameter portion 97 which is attached on an end to the first diameter portion 94 and on an opposite end to the second diameter portion 96.

Preferably, the inner seal member 56 is disposed between the sealing ring 30 and the hub ring 74. The inner seal member 56 may be a rotary seal. In this embodiment, the inner seal member may be formed from a rubber material and include a reinforcing member. The inner seal member 56 militates against a pressurized fluid, such as air, used in the tire inflation system 10 from entering an area between the hub 52 and the axle housing 14 and exiting the area 84 between the inner seal member 56 and the outer seal member 58.

Preferably, the inner seal member 56 is disposed at a location inboard from the outer seal member 58 and outboard from a tone ring 98. In certain embodiments, the inner seal member 56 is disposed on one of the sealing ring 30 and the hub ring 74 and is in sealing contact with the remaining one of the sealing ring 30 and the hub ring 74. In an embodiment, the inner seal member 56 is attached to the inner surface 82 of the hub ring 74. In this embodiment, the inner seal member 56 rotates with the hub 52 and a sealing portion of the inner seal member 56 is in sealing contact with the outer surface 32 of the sealing ring 30.

Preferably, the outer seal member 58 is disposed between the sealing ring 30 and the hub ring 74. The outer seal member 58 may be a rotary seal. In this embodiment, the outer seal member 58 may be formed from a rubber material and include a reinforcing member. The outer seal member 58 militates against a pressurized fluid, such as air, used in the tire inflation system 10 from entering the area between the hub 52 and the axle housing 14 and exiting the area 84 between the inner seal member 56 and the outer seal member 58.

The outer seal member 58 is disposed at a location inboard from the bearing sets 54, 54A and outboard from the inner seal member 56. In certain embodiments, the outer seal member 58 is disposed on one of the sealing ring 30 and the hub ring 74 and is in sealing contact with the remaining one of the sealing ring 30 and the hub ring 74. In an embodiment, the outer seal member 58 is attached to the inner surface 82 of the hub ring 74. In this embodiment, the outer seal member 58 rotates with the hub 52 and a sealing portion of the outer seal member 58 is in sealing contact with the outer surface 32 of the sealing ring 30.

The inner seal member 56 and the outer seal member 58 are spaced apart from one another and are disposed between the inner surface 82 of the hub ring 74 and the outer surface 32 of the sealing ring 30. The inner seal member 56 and the outer seal member 58 are sealingly engaged with the sealing ring 30 and the hub ring 74 and may be rotatably or non-rotatably disposed therebetween. The hub ring conduit 78 is in fluid communication with the conduit 34 formed through the sealing ring 30 through the area 84 between the inner seal member 56 and the outer seal member 58. The area 84 between the inner seal member 56 and the outer seal member 58 is defined by the sealing ring 30, seal members 56, 58 and hub ring 78.

Preferably, the inner seal member 56 and the outer seal member 58 are disposed on and about the outer surface 32 of the sealing ring 30. In an embodiment, the inner seal member 56 is disposed about the first diameter portion 46 and the outer seal member 58 is disposed about the second diameter portion 48 of the sealing ring 30. As the first diameter portion 46 has a diameter which is of a length that is greater than that of a diameter of the second diameter portion 48, the inner seal member 56 has a diameter which is of a length that is greater than that of a diameter of the outer seal member 58. For example, in this embodiment, an inner diameter of the inner seal member 56 is of a length which is greater than that of an inner diameter of the outer seal member 58.

Preferably, a space 100 is provided between the inboard bearing set 54A and the outer seal member 58. A bearing seal (not depicted) may be disposed between the hub 52 and the axle housing 14 in the space 100. The bearing seal may be conventional in the art. For example, the bearing seal may be formed from a rubber material and include at least one reinforcing member. Preferably, the bearing seal is disposed at a location inboard from the bearing sets 54, 54A and outboard of the outer seal member 58. The bearing seal may be disposed on one of the axle housing 14 and the hub 52 and is in sealing contact with the remaining one of the axle housing 14 and the hub 52.

Figure 4:
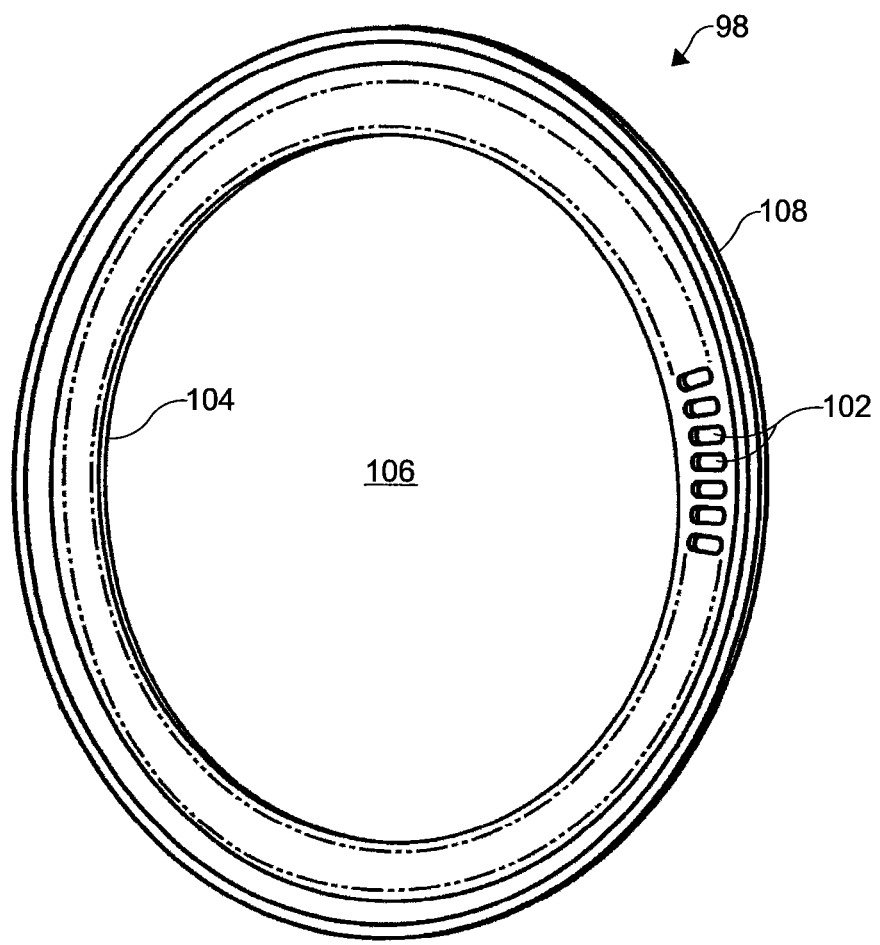
FIG. 4 depicts a perspective view of an embodiment of a tone ring suitable for use in the various embodiments of the tire inflation system.

In certain embodiments, the tire inflation system 10 comprises the tone ring 98. Tone rings are well known in anti-lock braking systems. An exemplary tone ring 98 suitable for use in the tire inflation system 10 is illustrated in FIG. 4. As illustrated, the tone ring 98 may comprise a plurality of apertures 102 and be generally ring-shaped. In this embodiment, the tone ring 98 comprises an inner diameter 104 which defines a major aperture 106 and an outer diameter 108.

As shown in FIG. 3, the tone ring 98 is attached to the outer surface 76 of the hub ring 74 at the inboard end portion thereof. Preferably, the tone ring 98 is press fit to the inboard end portion of the hub ring 74. As illustrated, the tone ring 98 may be provided inboard of the inner seal member 56 and the outer seal member 58. A mounting portion 110 may be provided inboard and adjacent to the tone ring 98. The mounting portion 110 is utilized to hold an anti-lock brake sensor (not depicted). Utilizing the anti-lock braking sensor, a vehicle speed and/or a rotational rate can be determined.

The secondary conduit 88 is in fluid communication with the hub ring conduit 78 on an end and a conduit 112 formed through a hollow wheel stud 62 on another end. Thus, the hub ring conduit 78 is in fluid communication with the conduit 112 formed through the hollow wheel stud 62 via the secondary conduit 88. The secondary conduit 88 is a tubular member which includes an inlet sealingly disposed in the hub ring 74 and an outlet sealingly disposed in the hollow wheel stud 62. In an embodiment, the secondary conduit 88 comprises a plurality of bend portions 114. Alternatively, it is understood that the secondary conduit 88 may be disposed through the hollow wheel stud 62. The secondary conduit 88 is in fluid communication with the sealing ring conduit 34 via the hub ring conduit 78 and the area 84 between the seal members 56, 58.

The hollow wheel stud 62 is a wheel stud comprising the conduit 112 formed therethrough. The hollow wheel stud 62 is disposed in the hub flange 68. In an embodiment (not depicted), an outer surface of the hollow wheel stud 62 has a thread formed thereon. The conduit 112 formed through the wheel stud 62 facilitates fluid communication between the secondary conduit 88 and a hose assembly (not shown). In certain embodiments (not depicted), the thread formed in the outer surface of the hollow stud 62 engages a lug nut (not depicted) to secure a tire rim (not depicted) to the hub 54.

The hose assembly comprises a fitting (not depicted), a hose (not depicted), and a valve fitting (not depicted). The fitting is sealingly engaged with the hollow wheel stud 62. Alternatively, the fitting may be sealingly engaged with the secondary conduit 88. The valve fitting is in fluid communication with the hollow wheel stud 62 via a conduit (not depicted) formed through the hose and the fitting. The valve fitting is sealingly engaged with a tire valve (not depicted).

In use, the tire inflation system 10 facilitates fluid communication between the hub ring conduit 78 and the hose assembly. When a fluid is pumped into or a pressure is applied to the sealing ring conduit 34, the fluid travels through or the pressure is applied to the area 84 between the inner seal member 56 and the outer seal member 58, the hub ring conduit 78, the secondary conduit 88, the wheel stud conduit 112 and the hose assembly.

The pump (not depicted) is capable of pumping the fluid into or applying a pressure to the secondary conduit and is activated by a controller (not depicted) in response to a pressure within a tire (not depicted) as determined by a pressure sensor (not depicted) in communication with the controller. Alternately, the pump may be activated manually by an operator of the vehicle that the tire inflation system 10 is incorporated in, at periodic intervals to ensure each of the tires is maintained at a desired pressure, in response to changes in ambient temperature, or in response to changes in terrain.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A tire inflation system, comprising:
    an axle housing;
    a sealing ring disposed on the axle housing, the sealing ring having a conduit formed therethrough;
    a hub rotatably disposed on the axle housing adjacent the sealing ring;
    a hub ring disposed on the hub adjacent the sealing ring and having a conduit formed therethrough;
    an inner seal member disposed between sealing ring and the hub ring; and
    an outer seal member disposed between the sealing ring and the hub ring, wherein the conduit formed through the hub ring is in fluid communication with the conduit formed through the sealing ring through an area between the inner seal member and the outer seal member.

2. The tire inflation system of claim 1, wherein the sealing ring is non-rotatably disposed on the axle housing.

3. The tire inflation system of claim 1, wherein the inner seal member and the outer seal member are spaced apart and disposed on separate surfaces of the sealing ring.

4. The tire inflation system of claim 1, wherein a space is provided between the outer seal member and a bearing set disposed between the hub and the axle housing.

5. The tire inflation system of claim 1, further comprising a tone ring which is attached to the hub ring and provided inboard of the inner seal member.

6. The tire inflation system of claim 1, wherein the inner seal member has a diameter which is of a length that is greater than that of a diameter of the outer seal member.

7. The tire inflation system of claim 1, wherein the conduit formed through the hub ring is in fluid communication with a conduit formed through a wheel stud.

8. The tire inflation system of claim 1, wherein the sealing ring comprises an outer surface which has a first diameter portion and a second diameter portion and wherein the inner seal member is provided about the first diameter portion and the outer seal member is provided about the second diameter portion.

9. The tire inflation system of claim 1, wherein the hub ring comprises an inner surface which has a first diameter portion and a second diameter portion and wherein the first diameter portion has a diameter which is of a length which is greater than that of a diameter of the second diameter portion.

10. The tire inflation system of claim 1, wherein the hub ring is disposed on an inboard end of the hub.

11. The tire inflation system of claim 1, wherein the hub ring has an inboard end portion which comprises a chamfered edge.

12. The tire inflation system of claim 1, wherein the conduit formed through the hub ring is formed in a perpendicular relationship with the axle housing and a portion of the conduit formed through the sealing ring is formed in a parallel relationship with the axle housing.

13. The tire inflation system of claim 1, further comprising an axle provided through the axle housing and drivingly engaged with the hub.

14. The tire inflation system of claim 1, wherein the hub ring comprises an outer surface which has a first diameter portion and a second diameter portion, wherein the first diameter portion has a diameter which is of a length that is less than that of the second diameter portion.

15. The tire inflation system of claim 1, further comprising a pump conduit in fluid communication with the conduit formed in the sealing ring, wherein the pump conduit extends around a portion of the outer surface of the axle housing.

16. The tire inflation system of claim 6, wherein the tone ring is press fit to an inboard end portion of the hub ring.

17. A tire inflation system, comprising:
an axle housing;
a sealing ring disposed on the axle housing, the sealing ring having a conduit formed therethrough which is in fluid communication with a pump conduit;
a hub rotatably disposed on the axle housing adjacent the seating ring;
a hub ring disposed on and attached to an end portion of the hub adjacent the sealing ring and having a conduit formed therethrough;
a tone ring attached to the hub ring and provided inboard of an inner seal member which is disposed between the sealing ring and hub ring; and
an outer seal member provided outboard of the inner seal member and disposed between the sealing ring and the hub ring, wherein the conduit formed through the hub ring is in fluid communication with the conduit formed through the sealing ring through an area between the inner seal member and the outer seal member and wherein the conduit formed through the hub ring is in fluid communication with a conduit formed through a wheel stud via a secondary conduit.

\* \* \* \* \*